United States Patent
Wong

(10) Patent No.: US 7,039,403 B2
(45) Date of Patent: May 2, 2006

(54) METHOD AND APPARATUS TO MANAGE A RESOURCE

(76) Inventor: Gregory A. Wong, 8011 SE. 36th St., Mercer Island, WA (US) 98040

( * ) Notice: Subject to any disclaimer, the term of this patent is extended or adjusted under 35 U.S.C. 154(b) by 693 days.

(21) Appl. No.: 10/039,577

(22) Filed: Oct. 26, 2001

(65) Prior Publication Data

US 2003/0083068 A1    May 1, 2003

(51) Int. Cl.
*H04Q 7/20*        (2006.01)
(52) U.S. Cl. .................... 455/435.1; 455/432.2; 455/433; 370/328; 370/338
(58) Field of Classification Search ............ 455/435.1, 455/435.2, 427, 432.1, 432.2, 433, 426.1; 370/338, 328
See application file for complete search history.

(56) References Cited

U.S. PATENT DOCUMENTS

| | | | |
|---|---|---|---|
| 5,483,672 A * | 1/1996 | Sasuta ......................... 455/509 |
| 5,485,505 A | 1/1996 | Norman et al. |
| 5,548,586 A | 8/1996 | Kito et al. |
| 5,603,084 A | 2/1997 | Henry, Jr. et al. |
| 5,625,885 A * | 4/1997 | Nakazawa et al. ......... 340/7.22 |
| 5,854,982 A | 12/1998 | Chambers et al. |
| 5,878,339 A | 3/1999 | Zicker et al. |
| 5,887,249 A | 3/1999 | Schmid |
| 5,887,253 A | 3/1999 | O'Neil et al. |
| 5,918,175 A * | 6/1999 | Tayloe et al. ............... 455/427 |
| 5,920,814 A * | 7/1999 | Sawyer et al. ........... 455/422.1 |
| 5,937,352 A | 8/1999 | Courtney et al. |
| 5,954,817 A | 9/1999 | Janssen et al. |
| 5,956,636 A | 9/1999 | Lipsit |
| 5,970,059 A | 10/1999 | Ahopelto et al. |
| 6,003,112 A * | 12/1999 | Tetrick ....................... 711/100 |
| 6,014,561 A | 1/2000 | Mölne |
| 6,016,428 A | 1/2000 | Diachina et al. |
| 6,018,656 A | 1/2000 | Shirai |
| 6,035,189 A | 3/2000 | Ali-Vehmas et al. |
| 6,073,015 A | 6/2000 | Berggren et al. |
| 6,073,016 A * | 6/2000 | Hulthen et al. .......... 455/435.2 |
| 6,097,963 A | 8/2000 | Boltz et al. |
| 6,266,523 B1 * | 7/2001 | Cook et al. ................. 455/403 |
| 6,393,298 B1 | 5/2002 | Fulton |
| 6,529,727 B1 | 3/2003 | Findikli et al. |
| 6,591,098 B1 | 7/2003 | Shieh et al. |
| 6,647,260 B1 | 11/2003 | Dusse et al. |

OTHER PUBLICATIONS

"Centrex, Feature Library," 1 page [downloaded from the World Wide Web on May 15, 2002].
Christensen, "Mobile Networking," 6 pp. (2000).
"GSM Architectures and Interfaces," 20 pp. (1998).
"GSM—Global System for Mobile Communication," 3 pp. [downloaded from the World Wide Web on May 15, 2002].
Heine, *GSM Networks: Protocols, Terminology, and Implementation,* Artech House, pp. iii-xi, 1-18, 31-38, 125-170, 185-273, and 407-416 (1999).

(Continued)

*Primary Examiner*—Danh Cong Le
(74) *Attorney, Agent, or Firm*—Klarquist Sparkman, LLP

(57) ABSTRACT

A method includes selecting a registration resource at a first location and assigning the registration resource to a customer at a second location. The registration resource is released at the second location independently of the first location.

16 Claims, 6 Drawing Sheets

OTHER PUBLICATIONS

International Telecommunications Union, ITU-T Recommendation E.212, "The International Identification Plan for Mobile Terminals and Mobile Users," 11 pp. (Nov. 1998).

"Introduction to GSM," 6 pp. [downloaded from the World Wide Web on May 14, 2002].

Scourias, "A Brief Overview of GSM," 11 pp. [downloaded from the World Wide Web on May 16, 2002].

"The SS7 Signaling Connection Control Part Relay System," 12 pp. [downloaded from the World Wide Web on May 16, 2002].

"Understanding Telecommunications," 21 pp. [downloaded from the World Wide Web on May 16, 2002].

Vedder, "The Subscriber Identity Module," 8 pp. [downloaded from the World Wide Web on Sep. 12, 2001].

* cited by examiner

METHOD AND APPARATUS TO MANAGE A RESOURCE

TECHNICAL FIELD

This invention relates to the management of a limited resource in a network. More specifically, the invention relates to the assignment and release of a limited resource in a distributed, and possibly wireless, network environment.

BACKGROUND

Wireless communication has become highly popular. Every day, people all over the world communicate using wireless telephones and pagers, to name just some of the wireless applications. Wireless networks are increasingly employed to communicate non-voice information, such as stock quotes, email, and text. Wireless networks may be global and span the equipment and services of multiple service providers.

When a customer purchases, leases, or otherwise acquires a wireless device, certain actions may be taken. These actions include registering the customer on the wireless network (e.g. identifying the customer to the network), and selecting a service plan for the customer. Once these actions are taken the customer may employ the wireless device to access the network in accordance with the selected service plan. For example, if the service plan includes Internet access, the customer may send and receive Internet email using the wireless device.

Some wireless devices and networks operate in accordance with the Global System for Mobile Communications (GSM). A GSM wireless device may comprise a subscriber identity module (SIM) including "smart card" technology. Smart card technology may include a microprocessor, memory, security features, and a digital interface all packaged in a small, slender form factor of an order of the size of a phone or credit card. The SIM may be inserted into or otherwise coupled to the wireless device to associate a customer identity with the device. The SIM may comprise an International Mobile Subscriber Identity (IMSI) which uniquely identifies the wireless customer to the network.

To access the network, the device may communicate the IMSI from the SIM to the network. The network may employ the IMSI to identify the customer and to provide access in accordance with the customer's selected service plan. The IMSI may be first communicated to a mobile switching center (MSC). The MSC may operate as a "front end" to the network by converting wireless signals to a form suitable for transmission in electrical or optical form. The MSC may communicate the IMSI to a home location registry (HLR) which may comprise a customer registry. The HLR may employ the IMSI to locate a record for the customer in the registry. The customer record may comprise permissions in accordance with the customer's selected service plan. The HLR may communicate these permissions to the MSC, and the MSC may then provide the customer's wireless device with access to the network in accordance with the permissions. For example, if the customer's service plan comprises data services, the permissions to the MSC may enable the wireless device to send and receive email via the network. If data service is lacking from the service plan, the permissions may enable only voice access.

In GSM networks, access to the network may not be granted until the MSC receives one or more mobile station integrated service digital network (MSISDN) numbers. An MSISDN number may be employed to initiate communication with the wireless device, e.g. it may be employed as the device's phone number.

A problem may arise with new wireless customers (e.g. customers previously unknown to the network and without a service plan). It may be advantageous to allow new customers access to the network in order that they may select a service plan. New customers may be provided with an IMSI at the point of sale, however, it may not be possible to assign an MSISDN number to the customer until after the customer selects a service plan. A "chicken and egg" situation arises in which the customer cannot select a service plan (at least, not using the wireless network) until they are assigned an MSISDN, and an MSISDN cannot be assigned until the customer selects a service plan.

SUMMARY

In one aspect, a registration resource is selected at a first location and assigned to a customer at a second location. The registration resource is released at the second location independently of the first location.

In another aspect, a first registration MSISDN number is selected from a set at a first location. The first registration MSISDN number is communicated to a second location, as is a first request to assign the first registration MSISDN to a customer. An error may be received from the second location indicating that the assignment failed. At the first location, a second registration MSISDN number is then selected from the set and communicated to the second location, as is a second request to assign the second registration MSISDN to the customer.

In yet another aspect, a first registration resource selected at a first location is received at a second location, as is a request to assign the first registration resource to a customer. A determination is made at the second location whether the first registration resource is already assigned to another customer. An error may be returned to the first location, and a second registration resource selected at the first location may be received at the second location, as well as a second request. A determination may be made at the second location that the second registration resource is not already assigned to another customer. The second registration resource is assigned to the customer.

DRAWINGS

DESCRIPTION

In the following figures and description, like numbers refer to like elements. References to "one embodiment" or "an embodiment" do not necessarily refer to the same embodiment, although they may.

One solution to the problem of enabling customer access to the network is to assign the customer a registration mobile station integrated service digital network (MSISDN) number. The registration MSISDN number may be provided to the mobile switch center (MSC) when the customer accesses the network to select a service plan. The permissions associated with the customer may not permit calls to the registration MSISDN number. Rather, the number is provided to the MSC, in conformance with the Global System for Mobile Communications (GSM), to enable access to the network for the purpose of selecting a service plan. The registration MSISDN number may be a limited resource in certain geographies, and thus may be selected from a set (sometimes referred to as a 'resource pool') of such numbers. Once a service plan has been selected, the registration MSISDN may be returned to the set for assignment to another customer.

Figure 1:
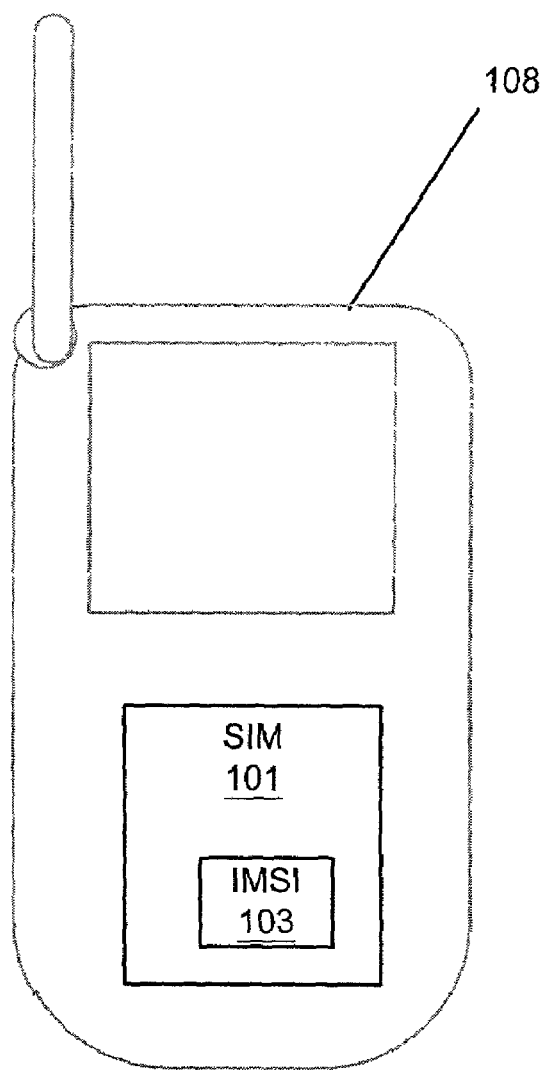
FIG. 1 is an illustration of an embodiment of a wireless device.

FIG. 1 shows an embodiment 108 of a wireless device. Examples of wireless devices are telephones, pagers, pocket computers, palm computers, laptop computers, and other devices with the capability to connect and interact with a wireless network. The device 108 may comprise a subscriber identity module (SIM) 101 having an International Mobile Subscriber Identity (IMSI) 103. The SIM 101 may be removable from the device 108, so that a person who operates the device 108 may remove the SIM 101 and couple it to another wireless device. In this manner, the SIM 101 is associated with a customer and their wireless service plan, and not necessarily with a particular wireless device.

Figure 2:
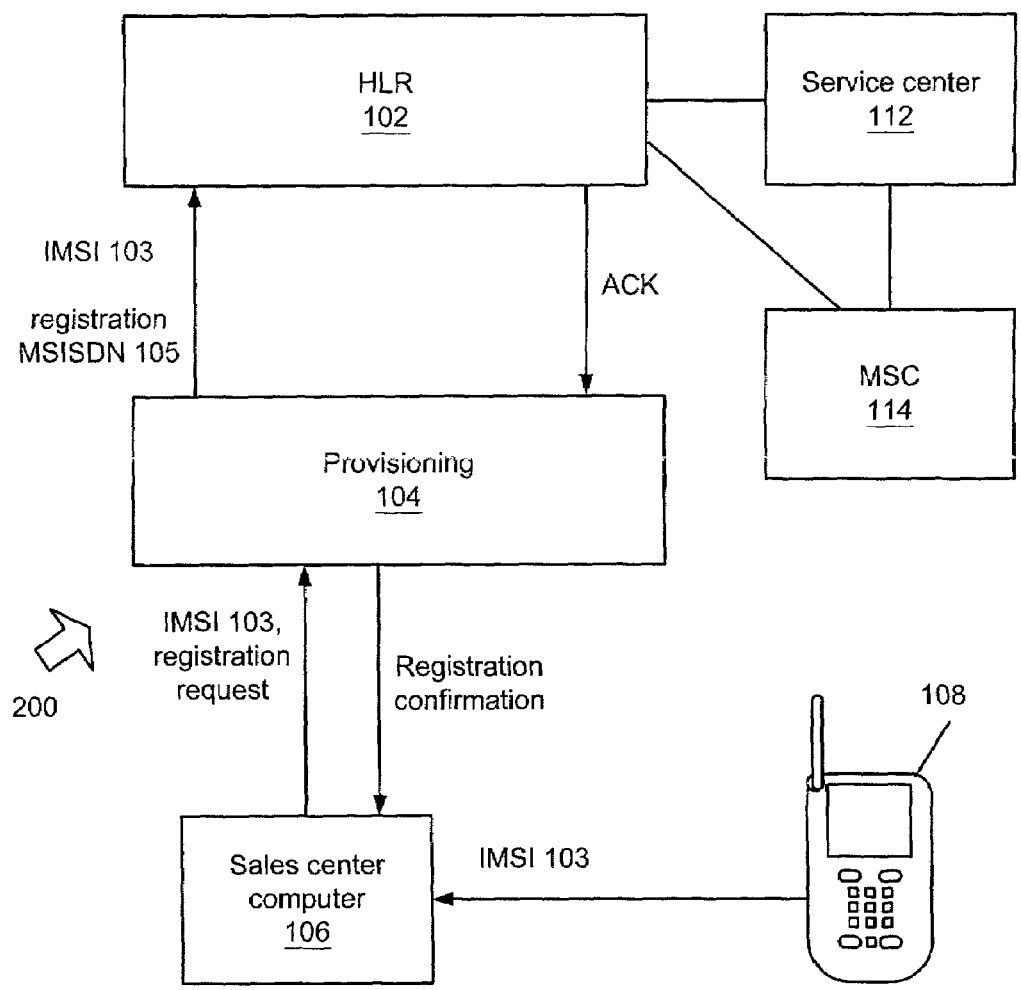
FIG. 2 is a block diagram of an embodiment of a wireless communication system.

FIG. 2 shows an embodiment 200 of a wireless communication system. The system 100 is involved with the registration of a wireless device 108 with a wireless network. In one embodiment an IMSI 103 is obtained from the device 108 at a point of sale. For example, when a customer purchases, leases, or otherwise obtains the wireless device 108 from a sales outlet, the device's IMSI 103 is obtained and provided to a sales computer 106. A 'sales computer' is any data processing device capable of manipulating information, including personal and desktop computers, laptop computers, terminals, handheld devices, and so on.

In one embodiment, in order for the customer to access the wireless network to choose a service plan, the customer must be registered on the network, where registration associates the customer's IMSI 103 with a registration MSISDN and access permissions. The sales computer 106 communicates the IMSI 103 and a registration request to a provisioning system 104. The provisioning system 104 is capable of receiving information communicated from the sales computer 106, and may comprise data processing capabilities, e.g. a processor and memory, to perform operations according to the received information.

The provisioning system 104 may comprise a single computer, or a 'site' or computer center, e.g. a system of more than one computer and associated peripheral equipment. In general, the provisioning system 104 is a system comprising a set of registration resources.

The provisioning system 104 may select a registration resource (registration MSISDN 105) to associate with the IMSI 103. The provisioning system 104 may communicate the IMSI 103 and the registration MSISDN 105 to the HLR 102. The HLR 102 performs a registration of the IMSI 103 and returns an acknowledgement (ACK). In response to the acknowledgement ACK, the provisioning system 104 returns a registration confirmation to the sales computer 106. The customer may now employ the device 108 to access the network to select a service plan.

To select a service plan, the customer activates the device 108 and accesses the wireless network by way of the MSC 114. The MSC 114 communicates with the HLR 102 and a service center 112 to verify the customer's registration, provide service options, receive and verify a selected service plan, and assign a service MSISDN. More details of this process are discussed below.

In one embodiment, the provisioning system 104 selects the registration MSISDN, whereas the HLR 102 assigns the registration MSISDN to the customer IMSI 103. The HLR 102 may also be responsible for releasing (removing the assignment) of the registration MSISDN once the customer selects a service plan. It may be advantageous, as described below, to avoid complex resource management protocols between the provisioning system 104 and the HLR 102.

Figure 3:
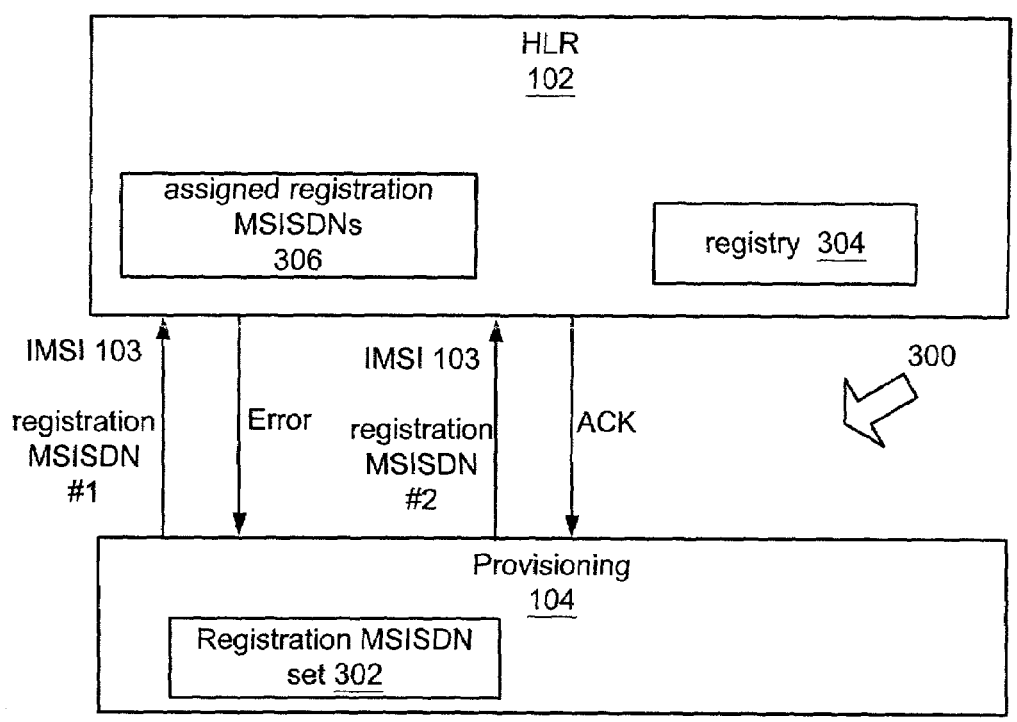
FIG. 3 is a block diagram of an embodiment of a wireless communication system.

FIG. 3 shows more details of an embodiment 300 of a wireless communications system. The provisioning system 104 and the HLR 102 are provided at separate locations, that is, the two are computationally and/or geographically separated. The provisioning system 104 comprises a set 302 of registration MSISDN resources. The set may comprise a range of resources, defined as a starting and ending values. Alternately, the set 302 may comprise discrete values of the resources, or a combination of ranges and discrete values. In one embodiment, the provisioning system 104 selects a registration MSISDN from the set 302 using a random or pseudo-random selection process. In other embodiments, a round-robin or other heuristic selection process may be employed. A first-selected registration MSISDN (#1) is communicated along with the IMSI to the HLR 102. The HLR 102 compares MSISDN #1 to one or more already assigned or otherwise unavailable registration MSISDN resources 306. The resources 306 which are already assigned or otherwise unavailable may be stored in various fashions, including but not limited to lists, tables, and data structures in volatile and/or non-volatile memory. When a match is found between MSISDN #1 and an assigned or unavailable resource 306, an error is returned from the HLR 102 to the provisioning system 104. The provisioning system 104 makes another selection from the set 302 (MSISDN #2) and communicates this selection to the HLR computer. When the HLR computer 102 determines no match between MSISDN #2 and an assigned or unavailable resource 306, an acknowledgement ACK is returned to the provisioning system 104. The HLR 102 associates the IMSI 103 with the registration MSISDN #2 in the registry 304, and adds the registration MSISDN #2 to the assigned or otherwise unavailable resources 306.

In one embodiment, the provisioning system 104 does not mark the registration MSISDN as assigned or otherwise unavailable in response to the acknowledgement from the HLR 102. Rather, the provisioning system 104 and the HLR 102 act independently in regard to managing the set 302. The provisioning system 104 selects the registration MSISDN numbers to assign; the HLR 102 makes and later releases the assignments, independently of the provisioning system 104. Complex resource management protocols between the two locations are thus avoided.

The HLR 102, like the provisioning system 104, may comprise a single computer, or a 'site' or computer center, e.g. a system of more than one computer and associated peripheral equipment. In general, the HLR 102 operates as a registry system. The HLR 102 assigns the registration resource to a customer in response to a request from the provisioning system 104, provided that the registration resource is not identified in the list 306, and the HLR 102 releases the registration resource independently of the provisioning system 104 upon receiving an indication that the customer has selected a service plan.

Both the HLR 102 and the provisioning system 104 may comprise machine-readable media comprising machine-executable instructions to carry out embodiments of the methods described herein. By way of example, and not limitation, machine readable media may comprise volatile and/or non-volatile media, removable and/or non-removable media, including: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other information storage medium. The machine readable media may be implemented in any method or technology for storage of information such as computer readable instructions, data structures, program modules or other data.

Figure 4:
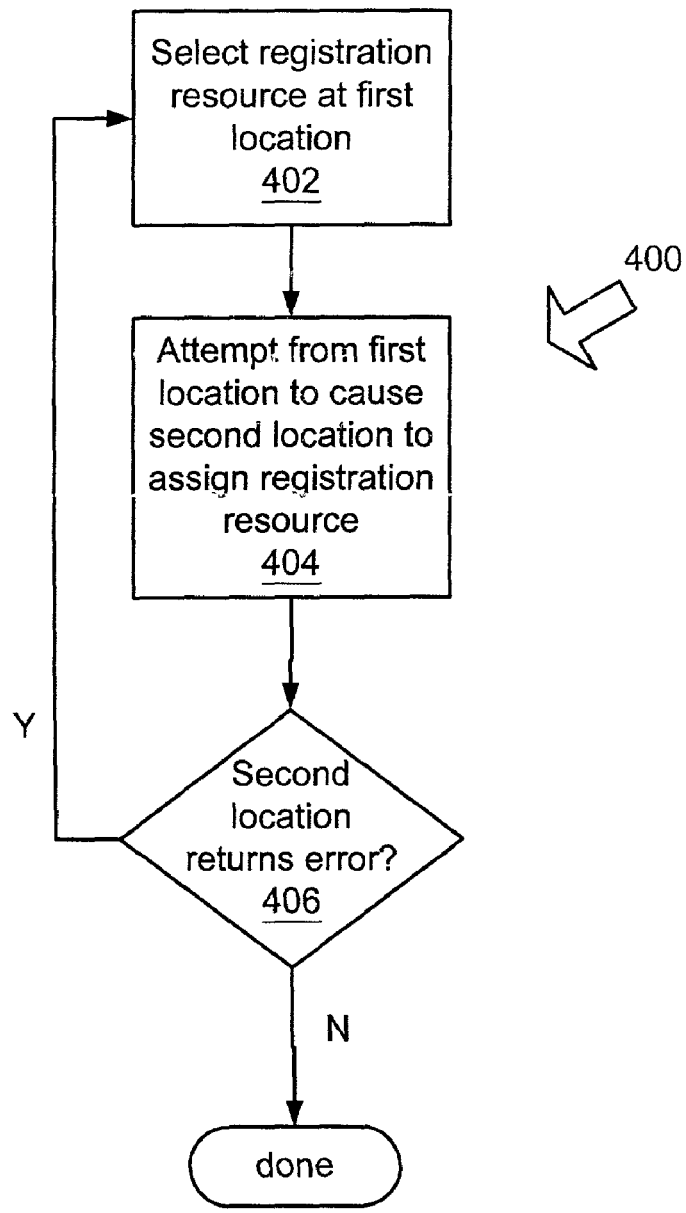
FIG. 4 is a flow chart showing an embodiment of a method to assign a registration resource.

FIG. 4 shows an embodiment 400 of a method to assign a registration resource. At 402 a registration resource is selected from a set of such resources at a first location. In one embodiment, the registration resource is a registration MSISDN and the first location is a provisioning system, but the invention is not limited in this regard. At 404 an attempt is made from the first location to assign the registration resource at a second location. In other words, the first location may attempt to cause the assignment to take place at the second location. In one embodiment, the second location is an HLR, but again the invention is not so limited. In one embodiment the assignment may take the form of associating a registration MSISDN with an IMSI in a registry, such as a customer, subscriber, or service registry. Again, any form of association of the resource with other data is contemplated, and the invention is not limited to a particular manner or application of assignment.

At 406 it is determined whether the second location returns an error related to the attempted assignment. If an error is returned, the method returns to 402 to select another registration resource at the first location. Otherwise, the method concludes.

Figure 5:
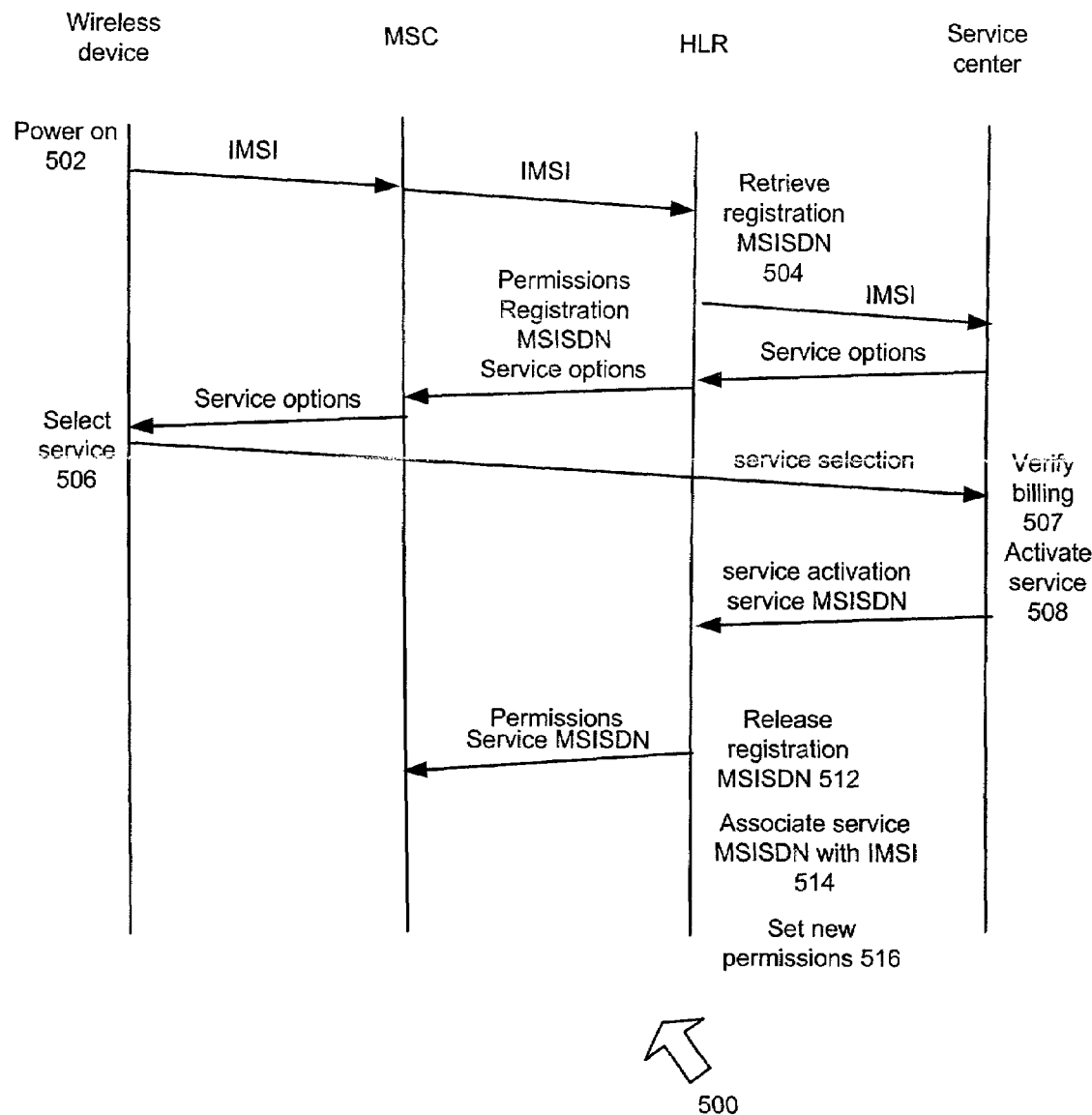
FIG. 5 is a flow chart showing a method embodiment to select a service plan.

FIG. 5 shows a method embodiment 500 to select a service plan. At 502, a wireless device is powered on subsequent to registration, resulting in an access of the wireless network by way of the MSC. Events other than a power on may initiate such subsequent access, including selection of a function from the keypad or other interface of the wireless device. The access results in the communication of the IMSI comprised by the device to the MSC, which forwards the IMSI to the HLR. In response, the HLR at 504 retrieves the registration MSISDN associated with the IMSI, verifying that the IMSI is registered. The HLR communicates with the service center to request service options for the wireless device and the associated customer. The service center communicates the service options to the HLR. In addition to the service options, the HLR communicates the registration MSISDN for the IMSI, which the MSC may require before granting continued access to the wireless network. A set of permissions may also be communicated from the HLR to the MSC, defining the extent to which the wireless device may access the wireless network. For example, at a point in time where the IMSI is registered but the customer has not selected a service plan, the permissions may limit the wireless device to accessing the network for the purposes of selecting a service plan. The wireless device may be prevented from initiating or receiving calls or performing any other communication on the network except to the extent involved in selecting a service plan.

The service options are communicated from the MSC to the wireless device. At 506 a service plan selection is made according to the options, and a service selection is communicated back to the service center. The service center may verify the customer's billing information 507 and activate the selected service 508 by communicating a service activation to the HLR. The service center may also communicate a service MSISDN to the HLR; in other embodiments, the HLR may select the service MSISDN from an available set of such resources.

In response, the HLR may at 512 release the registration MSISDN associated with the IMSI of the device by removing the registration MSISDN from the set 306 of assigned or otherwise unavailable registration resources. The registration MSISDN is released independently of provisioning which selected it; no communication occurs between the HLR and provisioning to effect the release. The HLR may associate the service MSISDN with the IMSI at 514, and at 516 set new permissions consistent with the selected service plan. The service MSISDN, which may be employed in subsequent accesses to the wireless network by the wireless device, is communicated to the MSC, along with the new permissions. The MSC will now provide the wireless device access the wireless network to an extent consistent with the new permissions. Typically, among other things, the wireless device may receive calls (e.g. connection requests) from other devices which specify the service MSISDN of the wireless device in the call request.

Figure 6:
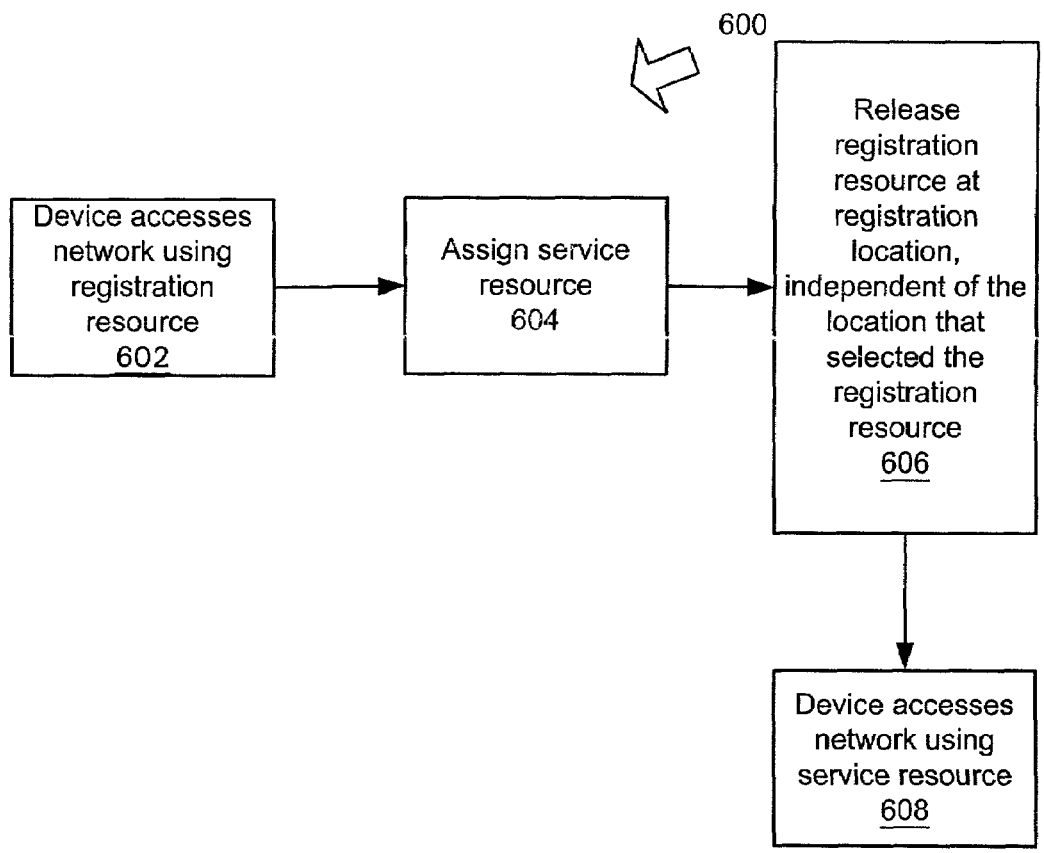
FIG. 6 is a flow chart showing a method embodiment to manage a resource.

FIG. 6 shows a method embodiment 600 to manage a resource. At 602 a device accesses a network using a registration resource. A service resource is assigned to the device, or (in the case of an IMSI or like resource) to a customer identification comprised by the device, at 604. At 606 the registration resource is released at the registration location, independently of the location which selected the registration resource (e.g. release is not effected through communication between the registration location and the selection location). At 608 the device subsequently accesses the network using the service resource. As FIG. 5 demonstrates, the device itself may never communicate or receive the registration or service resources; rather, such resources may be employed within the network to effect access for the device.

Having described and illustrated various embodiments, it will be recognized that the illustrated embodiments can be modified in arrangement and detail without departing from the principles and scope of the present invention. It should be understood that the programs, processes, or methods described herein are not related or limited to any particular type of data processing apparatus, unless indicated otherwise. Various types of general purpose or specialized data processing apparatus, including desktop computers and workstations, may be used with or perform operations in accordance with the teachings described herein. Elements of the illustrated embodiments may be implemented in software, hardware, firmware, or combinations thereof.

In view of the many possible embodiments to which the principles of the present invention may be applied, it should be recognized that the detailed embodiments are illustrative only and should not be taken as limiting in scope. Rather, the present invention encompasses all such embodiments as may come within the scope and spirit of the following claims and equivalents thereto.

What is claimed is:

1. A method comprising:
    at a first location, selecting a first registration MSISDN number from a set, wherein the first registration MSISDN number is potentially usable to register for a service and obtain a service MSISDN number to replace the first registration MSISDN number, and wherein the service MSISDN number but not the first registration MSISDN number is usable for the service;

communicating the first registration MSISDN number to a second location;

communicating a first request to the second location to assign the first registration MSISDN to a customer;

receiving an error from the second location indicating that the assignment failed;

at the first location, selecting a second registration MSISDN number from the set, wherein the second registration MSISDN number is potentially usable to register for the service and obtain the service MSISDN number to replace the second registration MSISDN number, and wherein the service MSISDN number but not the second registration MSISDN number is usable for the service;

communicating the second registration MSISDN number to the second location; and communicating a second request to the second location to assign the second registration MSISDN to the customer.

2. The method of claim 1 wherein selecting the first and second registration MSISDN numbers further comprises:

selecting the first and second registration MSISDN numbers using one of a random and pseudo-random selection process.

3. The method of claim 1 further comprising:

the second location assigning the second registration MSISDN number to the customer; and the second location releasing the assignment of the second registration MSISDN number independently of the first location.

4. The method of claim 3 further comprising:

communicating service options to the customer;

the second location releasing the assignment of the second registration MSISDN number upon a selection of a service plan by the customer; and the second location assigning the service MSISDN number to the customer.

5. A method comprising:

receiving at a second location a first registration resource selected at a first locations, wherein the first registration resource is potentially usable to register for a service and obtain a service resource to replace the first registration resource, and wherein the service resource but not the first registration resource is usable for the service;

receiving at the second location a request to assign the first registration resource to a customer;

determining at the second location that the first registration resource is already assigned to another customer;

returning to the first location an error;

receiving at the second location a second registration resource selected at the first location, wherein the second registration resource is potentially usable to register for the service and obtain the service resource to replace the second registration resource, and wherein the service resource but not the second registration resource is usable for the service;

receiving at the second location a request to assign the second registration resource to the customer;

determining at the second location that the second registration resource is not already assigned to another customer; and assigning the second registration resource to the customer.

6. The method of claim 5 further comprising:

receiving at the second location an indication that the customer has selected a service plan;

assigning the service resource to the customer; and releasing the assignment of the second registration resource independently of the first location.

7. The method of claim 5 wherein the first registration resource is a first MSISDN number, the second registration resource is a second MSISDN number different than the first MSISDN number, and the service resource is a third MSISDN number different than the first MSISDN number and the second MSISDN number.

8. A system comprising:

a provisioning system comprising a set of registration resources;

a registry system comprising a customer registry and a list of assigned and otherwise unavailable registration resources;

wherein:

the provisioning system selects a registration resource independently of the registry system, wherein the registration resource is potentially usable to register for a service and obtain a service resource to replace the registration resource, and wherein the service resource but not the registration resource is usable for the service;

the registry system assigns the registration resource to a customer in response to a request from the provisioning system, provided that the registration resource is not identified in the list of assigned and otherwise unavailable registration resources; and the registry system releases the registration resource independently of the provisioning system upon receiving an indication that the customer selected a service plan.

9. The system of claim 8, the registry further comprising:

an association of a customer number and the registration resource.

10. The system of claim 8 wherein the registration resource and the service resource are first and second MSISDN numbers, respectively.

11. An article comprising a machine-readable medium comprising instructions which, when executed by a data processing device, result in:

receiving at a second location a first registration resource selected at a first location, wherein the first registration resource is potentially usable to register for a service and obtain a service resource to replace the first registration resource, and wherein the service resource but not the first registration resource is usable for the service;

receiving at the second location a request to assign the first registration resource to a customer;

determining at the second location that the first registration resource is already assigned to another customer;

returning to the first location an error;

receiving at the second location a second registration resource selected at the first location, wherein the second registration resource is potentially usable to register for the service and obtain the service resource to replace the second registration resource, and wherein the service resource but not the second registration resource is usable for the service;

receiving at the second location a request to assign the second registration resource to the customer;

determining at the second location that the second registration resource is not already assigned to another customer; and assigning the second registration resource to the customer.

12. The article of claim 11 wherein the instructions, when executed by the data processing device, further result in:

receiving at the second location an indication that the customer has selected a service plan;

assigning the service resource to the customer; and releasing the assignment of the second registration resource independently of the first location.

13. The article of claim 11 wherein the first registration resource is a first MSISDN number, the second registration resource is a second MSISDN number different than the first MSISDN number, and the service resource is a third MSISDN number different than the first MSISDN number and the second MSISDN number.

14. An apparatus comprising:

a processor; and a machine-readable medium comprising instructions which, when executed by the processor, result in:

receiving at a second location a first registration resource selected at a first location, wherein the first registration resource is potentially usable to register for a service and obtain a service resource to replace the first registration resource, and wherein the service resource but not the first registration resource is usable for the service;

receiving at the second location a request to assign the first registration resource to a customer;

determining at the second location that the first registration resource is already assigned to another customer;

returning to the first location an error;

receiving at the second location a second registration resource selected at the first location, wherein the second registration resource is potentially usable to register for the service and obtain the service resource to replace the second registration resource, and wherein the service resource but not the second registration resource is usable for the service;

receiving at the second location a request to assign the second registration resource to the customer;

determining at the second location that the second registration resource is not already assigned to another customer; and assigning the second registration resource to the customer.

15. The apparatus of claim 14 wherein the instructions, when executed by the processor, further result in:

receiving at the second location an indication that to customer has selected a service plan;

assigning the service resource to the customer; and releasing the assignment of the second registration resource independently of the first location.

16. The apparatus of claim 14 wherein the first registration resource is a first MSISDN number, the second registration resource is a second MSISDN number different than the first MSISDN number, and the service resource is a third MSISDN number different than the first MSISDN number and the second MSISDN number.

* * * * *